United States Patent
Hunt

[15] 3,699,604
[45] Oct. 24, 1972

[54] BUTCHERS' BONE DUST SCRAPER
[72] Inventor: Charles J. Hunt, Morning View, Ky.
[73] Assignee: Vulcan Corporation, Cincinnati, Ohio
[22] Filed: March 22, 1971
[21] Appl. No.: 126,585

[52] U.S. Cl. ................................................15/236 R
[51] Int. Cl. .........................A22c 17/04, A22c 17/00
[58] Field of Search..........................15/236, 245, 105

[56] References Cited

UNITED STATES PATENTS

| 2,980,937 | 4/1961 | Defries | 15/236 R |
| 2,652,581 | 9/1953 | Richie | 15/236 R |
| 2,449,092 | 9/1948 | Struble | 15/236 R |
| 3,516,106 | 6/1970 | Roefaro | 15/236 R |

Primary Examiner—Leon G. Machlin
Attorney—Walter S. Murray

[57] ABSTRACT

A one-piece plastic butchers' hand tool for the removal of bone dust from newly cut and sawn meat surfaces is provided and comprises spaced apart, flexible scraper blades mounted, one within the other, on the cross-head part of a T-shaped handle; the terminal ends of each of said blades having integral connections with the opposed sides of the cross-head part of the handle. The blades are spaced from each other at said cross-head connections a distance that provides relatively wide clearance areas between the blades for sanitary cleaning of the tool.

3 Claims, 6 Drawing Figures

PATENTED OCT 24 1972 3,699,604
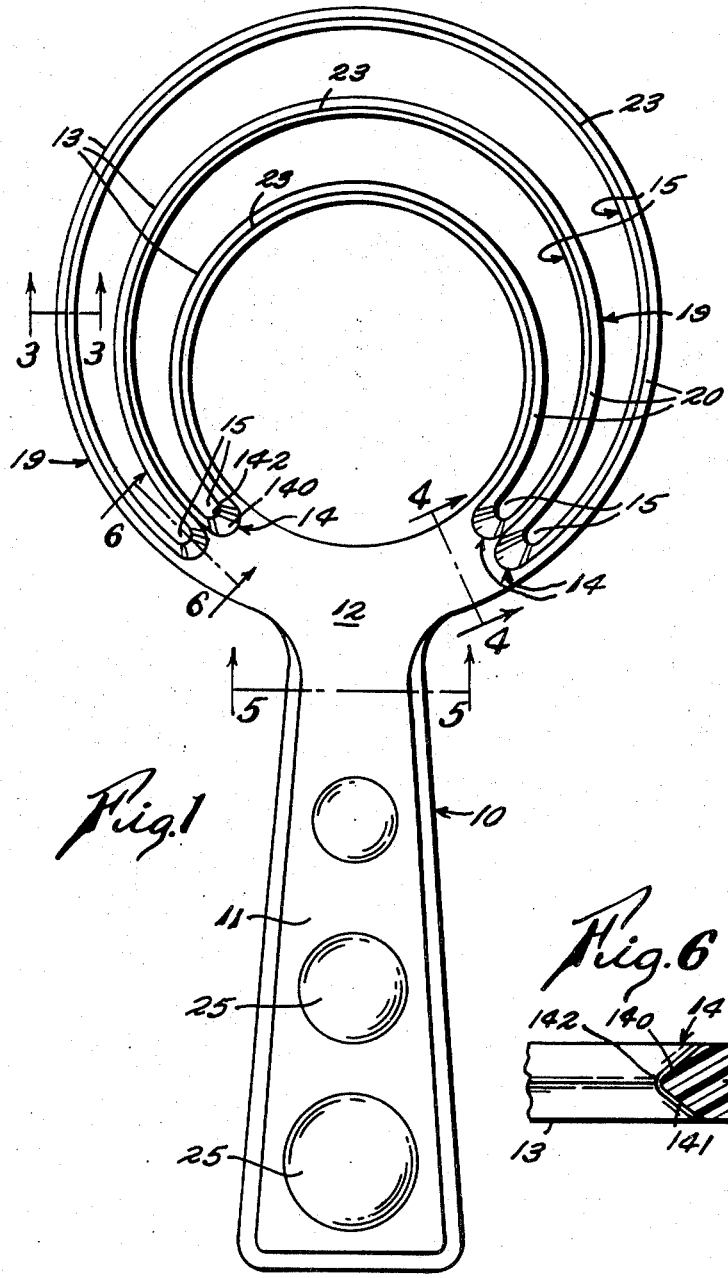
Fig.1
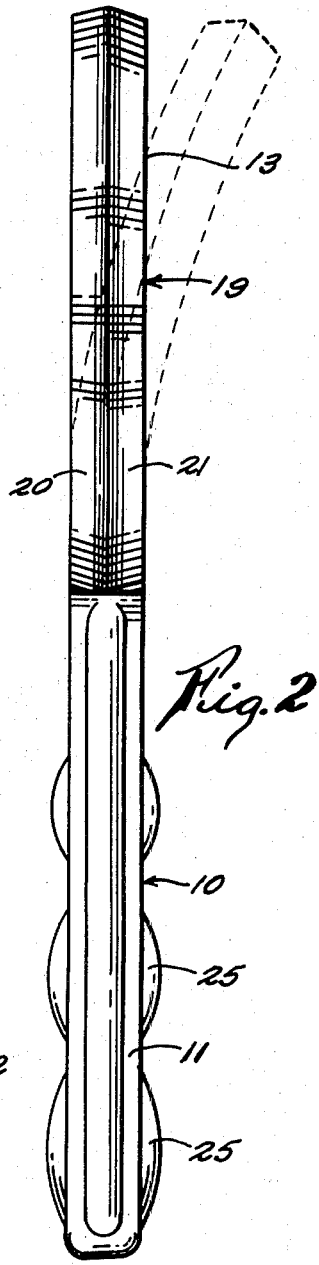
Fig.2
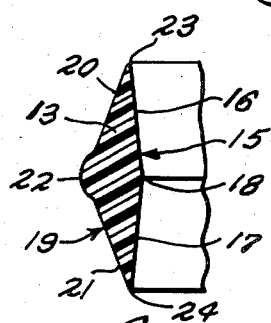
Fig.3
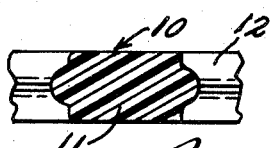
Fig.5
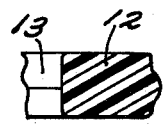
Fig.4
Fig.6
INVENTOR
Charles J. Hunt
BY
ATTY.

BUTCHERS' BONE DUST SCRAPER

The present invention relates to butchers' hand tools and is particularly directed to a bone dust scraper having improved sanitary characteristics.

An object of the invention is to provide an all-plastic tool which will remove bone dust from newly cut and sawn surfaces of meats and which has a novel construction that presents all its exterior surfaces for ready and thorough cleansing thereby providing a butchers' tool that will qualify under food inspection regulations.

Another object of the invention is to provide a one-piece plastic bone dust scraper that has excellent bone dust removing characteristics; is cheaply manufactured; and has a rugged and strong construction.

Other object will be apparent from the following specification taken in conjunction with the accompanying drawings wherein:

FIG. 1 is a plan view of my butchers' bone dust scraper.

FIG. 2 is a side view of the scraper shown in FIG. 1.

FIG. 3 is an enlarged section taken on line 3—3 of FIG. 1.

FIGS. 4, 5 and 6 are sections taken on lines 4—4 5—5 and 6—6, respectively of FIG. 1.

With reference to the drawings my butchers' tool comprises a generally T-shaped handle 10 having a hand grip part 11 and a cross-head part 12 integral on one end of the hand grip part. A number of flexible scraper blades 13 are mounted one within the other on the cross-head part 12 of the handle in spaced apart, nested positions. As best shown in FIG. 1 of the drawings, the terminal ends of each blade 13 are integrally connected to opposite sides of the handle cross-head part 12 and preferably are circular in plan and mounted eccentrically on said handle part. Other closed blade formations may be advantageously employed with my tool such as rectangular or triangular configurations.

The respective centers of the blades 13 may lie in the extension of the longitudinal center line of the handle and as depicted in FIG. 1 of the drawings adjacent blades diverge radially outwardly from their handle connections for greater effective scraping actions when brought into flexing contact with the meat surfaces, as is illustrated by dotted lines in FIG. 2 of the drawings. As best shown in FIG. 1 of the drawings the confronting face portions on the terminal ends of adjacent blades 13 are radially spaced apart and meet the sides of the cross-head part 12 by a spanning surface 14 formed in the side of the cross-head part, the spanning surface providing a relatively wide space 15 between adjacent blades at their closest proximity in the tool to insure thorough cleansing of the tool around the areas where the eccentrically positioned blades join the handle cross-head part 12. As clearly shown in FIGS. 1 and 6 the spanning wall 14 has rounded troughs 140 and 141 which converge outwardly to a rounded lip portion 142 to eliminate all square corners and provide strength to the blade connections with the handle.

Preferably my butchers' tool has a solid, one-piece body made of high-density polyethylene, polypropylene, or other plastic materials that will provide rugged resilience to the blades during the bone dust scraping operation, and as best illustrated in FIG. 3 of the drawings, each blade 13 is generally diamond shaped in section and has a slightly wedge shaped inner face 15 formed by inwardly inclined flat surfaces 16 and 17 that meet at a central wide angled ridge 18. Each blade also has a wedge shaped outer face 19 that may be formed by outwardly inclined flat surfaces 20 and 21 that meet in a rounded central rib 22; the opposed surfaces 16–20 and 17–21 forming between them relatively sharp scraper edges 23 and 24, respectively.

The hand grip part 11 of the handle may have hand engaging buttons 25, or the like, formed on opposed major faces thereof to ensure a good hold on the tool during use. It is also to be noted that my bone dust scraper may have identical major sides in order that the scraper may be picked up and used effectively with either scraper edge 23 or 24 thereof in contact with the meat surface to be scraped free of bone dust. Food inspection regulations require that all equipment and tools used in a butcher shop be cleaned daily. After meats have been severed by cutting and sawing, bone dust clings to the severed meat surfaces and this dust must be removed to better preserve the meat. My bone dust scraper is effectively used to remove this bone dust from the severed meat surfaces by grasping the handle, pressing the outer ends of the blades against the said surfaces and drawing the tool with a scraping action across the said surfaces. Bone dust removed from the meat surfaces and which remain clinging to the scraper blades after use are readily cleansed therefrom by a simple washing process as all surfaces of my tool are fully exposed to the cleansing action, thus providing a sanitary butchers' tool that will respond to the most stringent food inspection regulations.

Having thus described my invention what I claim as new is:

1. A sanitary, one-piece bone dust scraping tool comprising a handle portion having an elongated hand grip part and a head part, a number of spaced apart scraper blades normally disposed one within the other, each said blade having its terminal ends joined to opposite sides of the head part, a pair of blade spanning surfaces formed on the head part connecting confronting face portions on the terminal ends of adjacent blades, said spanning surfaces converging outwardly from the head part into the space between adjacent blades and meeting in a terminal lip portion, whereby all exterior surfaces of the tool are fully exposed for thorough cleaning purposes.

2. A bone dust scraping tool set forth in claim 1 wherein each blade is diamond shaped in section and has slightly wedge shaped inner and outer faces formed by inclined flat surfaces that meet at a central wide angled ridge.

3. A bone dust scraping tool as set forth in claim 2 wherein the terminal lip portion is rounded and meets confronting face portions of adjacent blades at their ridges.

* * * * *